(12) United States Patent
Kong

(10) Patent No.: US 9,851,802 B2
(45) Date of Patent: Dec. 26, 2017

(54) METHOD AND APPARATUS FOR CONTROLLING CONTENT PLAYBACK

(71) Applicant: Samsung Electronics Co., Ltd., Gyeonggi-do (KR)

(72) Inventor: Hyoung-Suk Kong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 224 days.

(21) Appl. No.: 14/143,806

(22) Filed: Dec. 30, 2013

(65) Prior Publication Data

US 2014/0215411 A1 Jul. 31, 2014

(30) Foreign Application Priority Data

Jan. 28, 2013 (KR) ........................ 10-2013-0009286

(51) Int. Cl.
| | |
|---|---|
| *G06F 3/01* | (2006.01) |
| *G06F 3/0488* | (2013.01) |
| *G06F 3/041* | (2006.01) |
| *G06F 15/02* | (2006.01) |
| *G06F 3/0487* | (2013.01) |

(52) U.S. Cl.
CPC ............ *G06F 3/017* (2013.01); *G06F 3/0487* (2013.01); *G06F 3/04883* (2013.01)

(58) Field of Classification Search
None
See application file for complete search history.

(56) References Cited

U.S. PATENT DOCUMENTS

| | | |
|---|---|---|
| 2003/0048305 A1 | 3/2003 | Liang et al. |
| 2003/0227441 A1 | 12/2003 | Hiokl et al. |
| 2004/0212588 A1 | 10/2004 | Moriyama |
| 2006/0033721 A1* | 2/2006 | Woolley ................. G06F 3/044 345/173 |
| 2006/0194181 A1* | 8/2006 | Rosenberg .............. G09B 5/06 434/317 |
| 2007/0085845 A1* | 4/2007 | Kikuchi ............... G06F 3/0412 345/204 |
| 2008/0022223 A1 | 1/2008 | Seet et al. |

(Continued)

FOREIGN PATENT DOCUMENTS

| | | |
|---|---|---|
| CN | 102792256 | 11/2012 |
| EP | 2 674 834 | 12/2013 |

(Continued)

OTHER PUBLICATIONS

Merriam-Webster, "MerriamWebster_DefinitionofRange", http://www.merriam-webster.com/dictionary/range.*

(Continued)

*Primary Examiner* — Matthew Ell
*Assistant Examiner* — Nhat-Huy T Nguyen
(74) *Attorney, Agent, or Firm* — The Farrell Law Firm, P.C.

(57) ABSTRACT

A method and an apparatus are provided for controlling content in an electronic device. A gesture detection area that detects a gesture of a user is displayed, when a display unit of the electronic device is deformed during content playback. A range of the gesture detection area corresponds to a degree of the content playback. The gesture of the user is detected in the gesture detection area. The content being played is controlled in accordance with the gesture of the user.

15 Claims, 12 Drawing Sheets

(56) References Cited

U.S. PATENT DOCUMENTS

| | | | |
|---|---|---|---|
| 2008/0273018 A1 | 11/2008 | Woolley et al. | |
| 2012/0176385 A1* | 7/2012 | Gunji | G06F 3/0483 |
| | | | 345/441 |
| 2013/0191711 A1* | 7/2013 | Tashman | G06F 17/241 |
| | | | 715/205 |
| 2013/0222416 A1* | 8/2013 | Kim | G09G 3/20 |
| | | | 345/619 |
| 2013/0321340 A1 | 12/2013 | Seo et al. | |

FOREIGN PATENT DOCUMENTS

| | | |
|---|---|---|
| JP | 07-28791 | 1/1995 |
| JP | H08249344 | 9/1996 |
| JP | 2004-185331 | 7/2004 |
| JP | 2007058560 | 3/2007 |
| JP | 2007-108441 | 4/2007 |
| JP | 2012-190277 | 10/2012 |
| WO | WO 2012/108668 | 8/2012 |

OTHER PUBLICATIONS

European Search Report dated Oct. 5, 2017 issued in counterpart application No. 14150618.8-1507, 8 pages.
Japanese Office Action dated Oct. 17, 2017 issued in counterpart application No. 2013-256114, 9 pages.
Chinese Office Action dated Nov. 1, 2017 issued in counterpart application No. 201410042341.5, 18 pages.

* cited by examiner

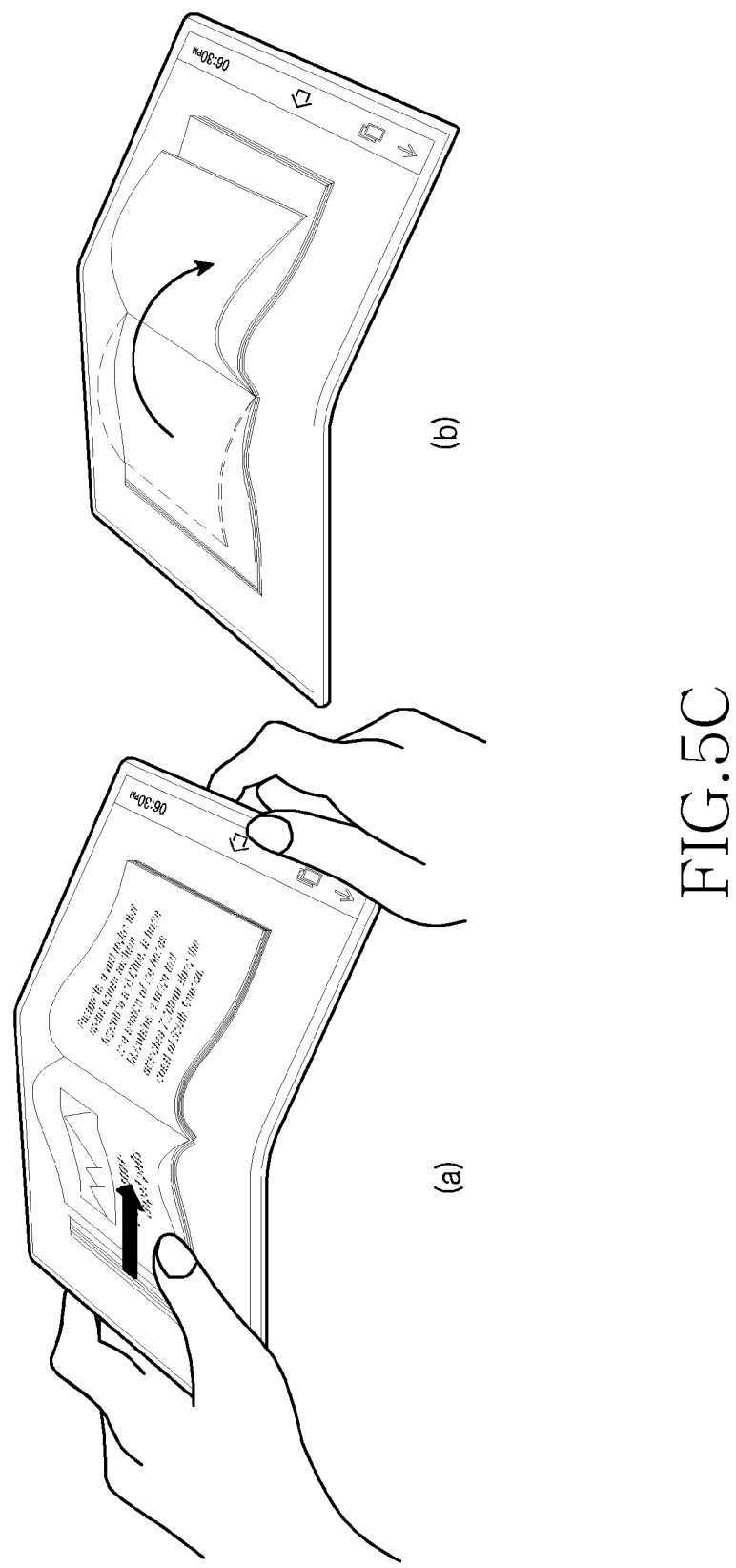

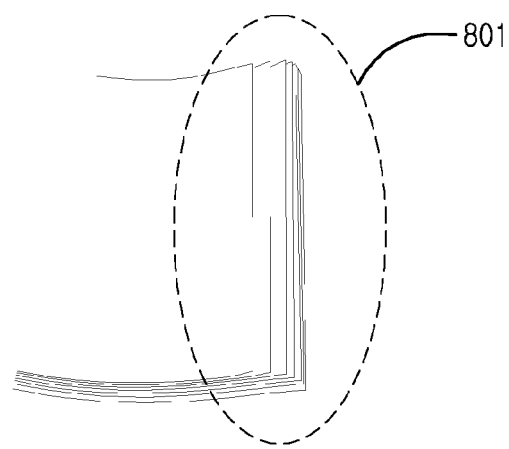
FIG.8A
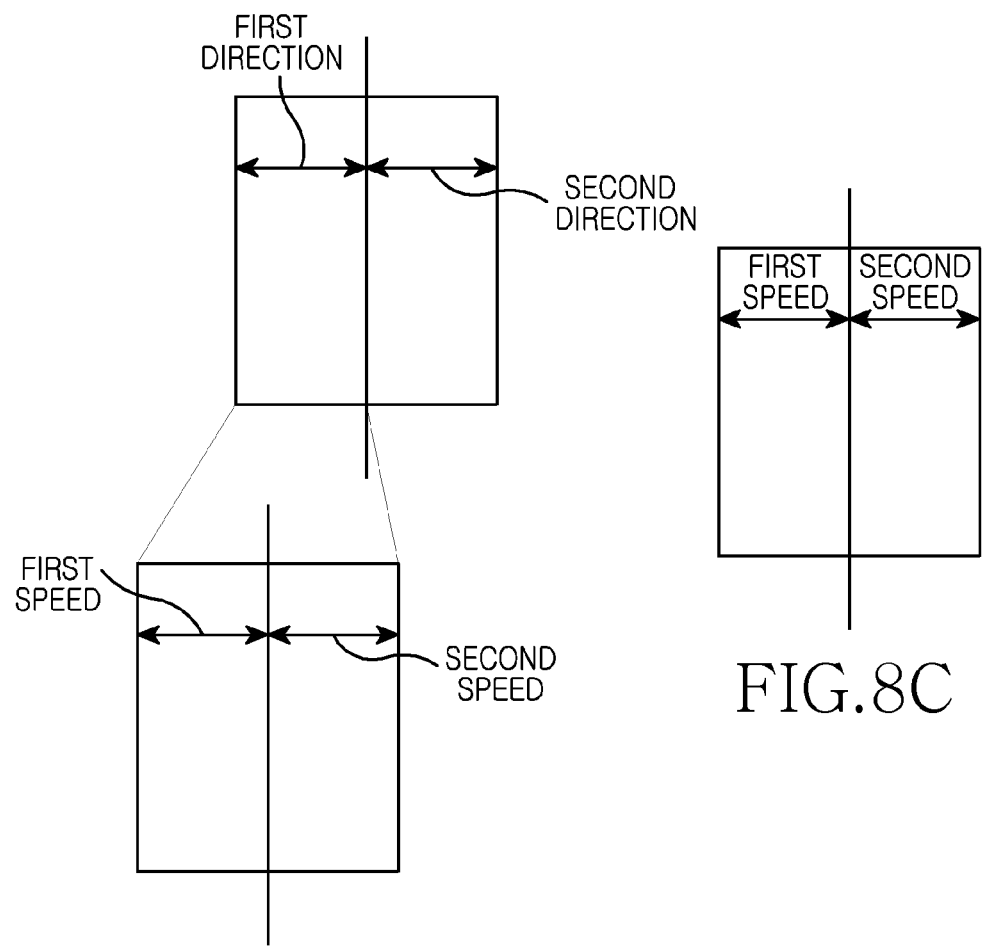
FIG.8B
FIG.8C

METHOD AND APPARATUS FOR CONTROLLING CONTENT PLAYBACK

PRIORITY

This application claims priority under 35 U.S.C. §119(a) to an application filed in the Korean Intellectual Property Office on Jan. 28, 2013 and assigned Serial No. 10-2013-0009286, the contents of which are incorporated herein by reference.

BACKGROUND OF THE INVENTION

1. Field of the Invention

The present invention relates generally to a method and an apparatus for displaying content in an electronic device, and more particularly, to a method and an apparatus for controlling playback of displayed content in an electronic device.

2. Description of the Related Art

As technology has developed for electronic devices and wireless Internet connections, application ranges for the electronic devices have broadened. For example, electronic devices may be utilized in games, remote controllers using short range communications, image capturing by a mounted digital camera, simple phone calls, and scheduling.

As multimedia services have been provided, the amount of information processed and displayed by the electronic devices has increased. Accordingly, there is a growing interest for electronic devices equipped with a touch screen, which increases the size of a display unit by improving space utilization.

The touch screen is an input/display device in one screen that inputs and displays information. Accordingly, when the touch screen is used, the electronic device may increase the display area by removing additional input devices such as, for example, a keypad. For example, when a full touch type is used (i.e., an entire screen is applied as a touch screen), the front of the electronic device is utilized as a screen, so that the screen size may be increased.

An electronic-book (e-book) has been introduced that displays text content on the touch screen. The text content is stored in a memory or built-in hard disk. A large number of books may be stored in the memory or built-in hard disk at the same time and may be selected for displaying content that a user wants. The electronic device also provides effects as if an actual paper was displayed. For example, the electronic device may provide effects such as turning a page of a book by providing graphic and sound effects of turning a page.

Furthermore, recently, a flexible display has been applied to the electronic device, so that it is able to provide a feeling of folding or unfolding an actual paper to the user. In general, a user may not gain the same sense of accomplishment when reading an electronic-paper (e-paper) or e-book through the electronic device, because the user does not receive a tactile sense for a page. For example, the user does not receive a tactile sense for remaining pages while touching the side of the electronic device.

SUMMARY OF THE INVENTION

The present invention has been made to address at least the above problems and/or disadvantages and to provide at least the advantages described below. Accordingly, an aspect of the present invention provides a method and an apparatus for controlling content playback by modifying a display unit of an electronic device.

Another aspect of the present invention provides a method and an apparatus for changing a playback time of content by modifying a display unit of an electronic device.

An additional aspect of the present invention provides a method and an apparatus for checking the degree of content playback by modifying a display unit of an electronic device.

A further aspect of the present invention provides a method and an apparatus for displaying an index of content by modifying a display unit of an electronic device.

According to an aspect of the present invention, a method is provided for controlling content in an electronic device. A gesture detection area that detects a gesture of a user is displayed, when a display unit of the electronic device is deformed during content playback. A range of the gesture detection area corresponds to a degree of the content playback. The gesture of the user is detected in the gesture detection area. The content being played is controlled in accordance with the gesture of the user.

According to another aspect of the present invention, an apparatus is provided for controlling content of an electronic device. The apparatus includes a display unit configured to be deformable and to display content. The apparatus also includes a processor configured to display a gesture detection area that detects a gesture of a user when the display unit is deformed during content playback, detect the gesture of the user in the gesture detection area, and control the content being played in accordance with the gesture of the user. A range of the gesture detection area corresponds to a degree of the content playback.

According to an additional aspect of the present invention, a non-transitory computer readable recording medium is provided having a program recorded thereon, which, when executed by a computer, implements the steps of displaying a gesture detection area that detects a gesture of a user, when a display unit of the electronic device is deformed during content playback, a range of the gesture detection area corresponding to a degree of the content playback; detecting the gesture of the user in the gesture detection area; and controlling the content being played in accordance with the gesture of the user.

BRIEF DESCRIPTION OF THE DRAWINGS

The above and other aspects, features, and advantages of the present invention will be more apparent from the following detailed description when taken in conjunction with the accompanying drawings, in which:

FIG. 5C is a diagram illustrating a screen for turning a page in a second direction in an electronic device, according to an embodiment of the present invention;

FIGS. 8A-C are diagrams illustrating an interval control area displayed by an electronic device, according to another embodiment of the present invention;

DETAILED DESCRIPTION OF EMBODIMENTS OF THE PRESENT INVENTION

Figure 1:
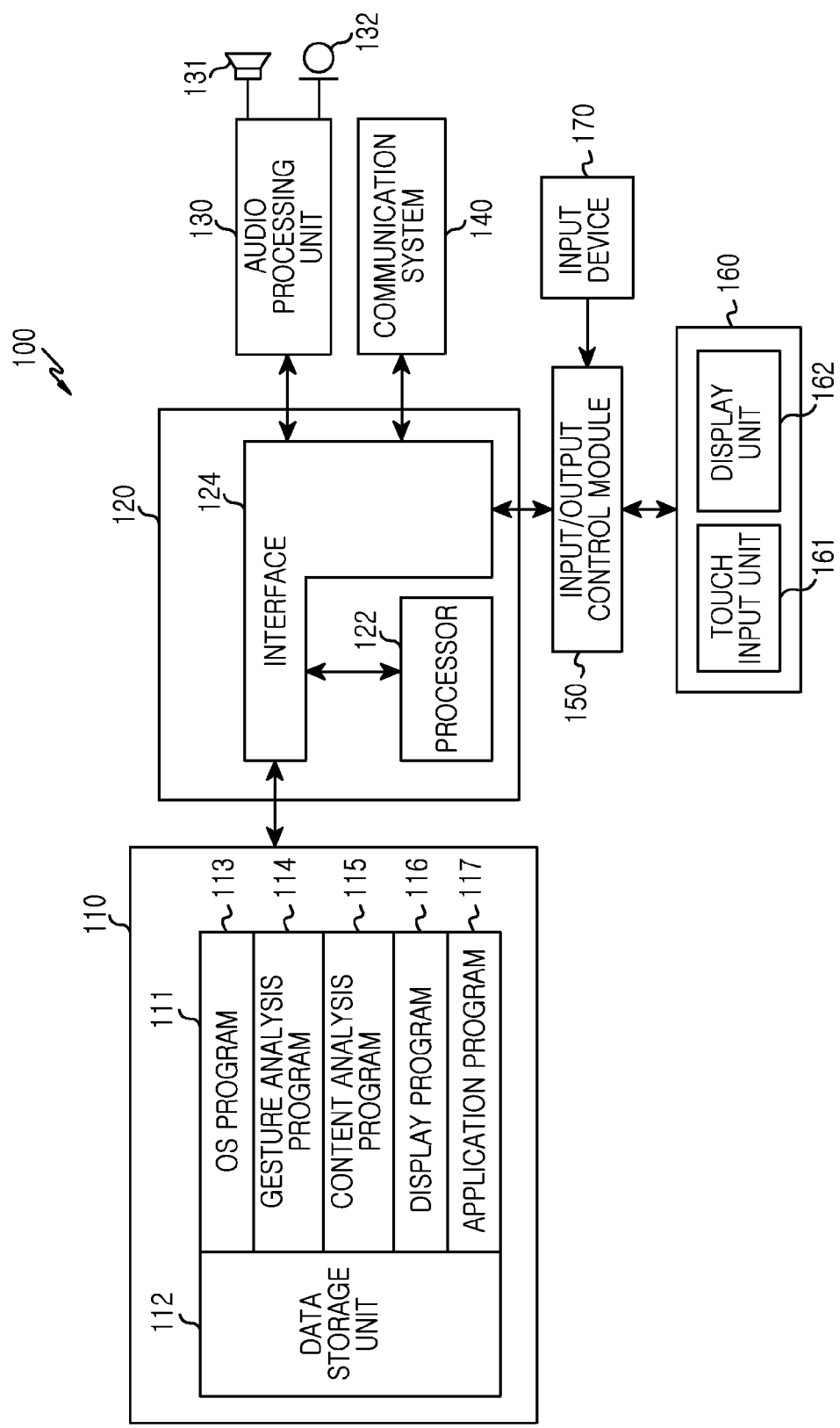
FIG. 1 is a block diagram illustrating a configuration of an electronic device controlling content playback, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention. Also, the terms used herein are defined according to the functions of the present invention. Thus, the terms may vary depending on user's or operator's intentions or practices. Therefore, the terms used herein must be understood based on the descriptions made herein.

In the following description, a method and an apparatus for controlling content played in an electronic device is described.

The electronic device may include a flexible display unit that may be bent, curved, folded, rolled, stretched, twisted, unfolded, or wrinkled according to an external force.

Furthermore, the electronic device may be embodied as a portable electronic device, and also may be embodied as a device such as a portable terminal, a mobile phone, a media player, a tablet computer, a handheld computer, or a Personal Digital Assistant (PDA). Additionally, the electronic device may be embodied as an arbitrary portable electronic device combining at least two functions of such devices.

FIG. 1 is a block diagram illustrating a configuration of an electronic device controlling content playback, according to an embodiment of the present invention.

As shown in FIG. 1, an electronic device 100 includes a memory 110, a processor unit 120, an audio processing unit 130, a communication system 140, an input/output control unit 150, a touch screen 160, and an input device 170. At least one component in the above-mentioned configuration may include a plurality of components. According to an embodiment of the present invention, the electronic device 100 may include a plurality of memories or a plurality of communication systems.

The memory 110 includes a program storage unit 111 storing a program for controlling an operation of the electronic device 100, and a data storage unit 112 storing data generated during program execution. For example, the data storage unit 112 may store various pieces of updatable data for storage such as, for example, phone books, outgoing messages, and incoming messages, and also may store a reference value used for determining a deformation of a display unit 162, according to an embodiment of the present invention.

The data storage unit 112 may store a user's gesture for controlling content being played.

The user's gesture may switch a playback time of the content. The switching of the playback time may include switching a page of an e-book and changing the playback time of multimedia data.

The user's gesture may result in the display of the index of content being played.

The user's gesture may check the degree of content playback (i.e., the amount of a content that has been played or the amount of a content to be played).

The program storage unit 111 includes an Operating System (OS) program 113, a gesture analysis program 114, a content analysis program 115, a display program 116, and at least one application program 117. Programs included in the program storage unit 111 may be expressed as an instruction set.

The OS program 113 may include various software components for controlling general system operations. Controlling such a general system operation includes, for example, memory management and control, storage hardware (device) control and management, and power control and management. The OS program 113 may serve to allow smooth communication between hardware (devices) and program components (modules).

The gesture analysis program 114 may analyze a user's gesture detected from the touch screen 160 of the electronic device 100 and may include various software components for analyzing a user's gesture to control content being played.

The gesture refers to a touch pattern on the touch screen 160 of the electronic device 100. The touch is made on a touch screen of an electric device through external input means such as, for example, a user's finger or a stylus pen, and the gesture refers to a drag of a predetermined pattern while the touch is maintained on the touch screen. If necessary, the gesture refers to a drag and touch release while the touch is maintained.

For example, the gesture analysis program 114 may analyze a user's gesture for switching a content playback time. The gesture analysis program 114 analyzes the user's gesture and checks a direction and range of the switched content playback time.

The gesture analysis program 114 may analyze a user's gesture to display the index of content being played.

The gesture analysis program 114 may analyze a user's gesture for checking the degree of content playback (i.e., the amount of content that has been played or the amount of a content to be played).

The gesture analysis program 114 analyzes a user's gesture detected from an interval control area and delivers the analyzed result to the content analysis program 115.

The content analysis program 115 includes various software components for controlling content execution.

For example, the content analysis program 115 checks the degree of playback on content being played. According to an embodiment of the present invention, the content analysis program 115 checks the amount of content that has been played or the amount of content to be played.

The content analysis program 115 may check a turned page and the index of content.

The content analysis program 115 may deliver an analysis result on content to the display program 116.

The display program 116 may include various software components for providing and displaying graphics on the touch screen 160. The term "graphics" includes texts, web pages, icons, digital images, videos, and animations.

The display program 116 may display an interval control area for detecting a gesture to control a playback of content being played when the form of the display unit 162 is deformed.

The display program 116 may change a playback time (e.g., page turning) of a content played, according to a user's gesture or display the degree of content playback according to an embodiment of the present invention.

The display program 116 may display the index of a content played according to a gesture that is detected through the displayed interval control area.

The application program 117 may include a software component for at least one application program installed in the electronic device 100.

The processor unit 120 includes at least one processor 122 and an interface 124. The processor 122 and the interface 124 may be integrated as one circuit or may be implemented using an additional component.

The interface 124 may serve as a memory interface for controlling an access of the processor 122 and the memory 110.

Furthermore, the interface 124 may serve as a peripheral device interface for controlling a connection between an input/output peripheral device and the processor 122 of the electronic device 100.

The processor 122 controls content played using at least one software program. The processor 122 executes at least one program stored in the memory 110 so as to perform a function corresponding to a corresponding program. For example, when the form of the display unit 162 is deformed, the processor 122 may include a display processor for performing an operation corresponding to a playback time change of content, a playback degree provision, or an index check of content.

According to an embodiment of the present invention, a content playback control function of the electronic device 100 may be performed by using software, such as a program stored in the memory 110, or hardware, such as the display processor. The content playback control function of the electronic device 100 may be automatically executed when the form of the display unit 162 is deformed, or may be executed when a gesture input for performing the function (e.g., touch input, menu input, or button input) is detected.

The audio processing unit 130 may provide an audio interface between a user and the electronic device 100 through a speaker 131 and a microphone 132. For example, the audio processing unit 130 may output an audio effect according to a playback control of content.

The communication system 140 may perform a communication function for voice communication and data communication of the electronic device 100. The communication system may include a plurality of communication sub modules for supporting different communication networks. For example, a communication network is not limited to the above, and may include a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a wireless LAN, a Bluetooth network, and Near Field Communication (NFC).

The input/output control unit 150 may provide an interface between an input/output device (e.g., the touch screen 160 and the input device 170) and an interface.

The touch screen 160, as an input/output device for inputting/outputting information, includes a touch input unit 161 and the display unit 162.

The touch input unit 161 may provide touch information obtained through a touch panel to the processor unit 120 through the input/output control unit 150. The touch input unit 161 may change touch information into an instruction structure such as, for example, touch_down, touch_move, and touch_up, and then provide it to the processor unit 120, so that input data for controlling content is generated according to an embodiment of the present invention.

The display unit 162 may display state information of the electronic device 100, characters entered by a user, moving pictures, and still pictures. The display unit 162 is bent, curved, folded, rolled, stretched, twisted, unfolded, or wrinkled according to external force.

Furthermore, the display unit 162 may display content controlled by a user's gesture, according to an embodiment of the present invention.

The input device 170 may provide input data generated by a user's selection to the processor unit 120 through the input/output control unit 150. For example, the input device 170 may be configured to include only a control button for controlling the electronic device 100. In another embodiment of the present invention, the input device 170 may be configured to include a keypad for receiving input data from a user.

The input device 170 may generate input data for controlling content, according to an embodiment of the present invention.

The electronic device 100 may include a sensor unit for detecting a deformation of the electronic device 100, i.e., one deformation of stretch, shrinkage, curving, bending, twist, folding, and unfolding. These deformations correspond to the deformations of the display unit 162. For example, the sensor unit may detect a screen deformation of the display unit 162, i.e., one deformation of stretch, shrinkage, curving, bending, twist, folding, and unfolding. Furthermore, the sensor unit may measure the degree of deformation such as bending, folding, twist, curving, and unfolding.

Information detected by a sensor unit is used to operate a program in the memory 110.

The electronic device 100 may further include components for providing additional functions (e.g., a camera module for capturing an image or moving picture, a broadcast receiving module for receiving a broadcast, a digital music playing module such as an MP3 module, a short-range wireless communication module for short-range wireless communication, and a proximity sensor module for proximity sensing) and also, software for operations thereof.

Figure 2:
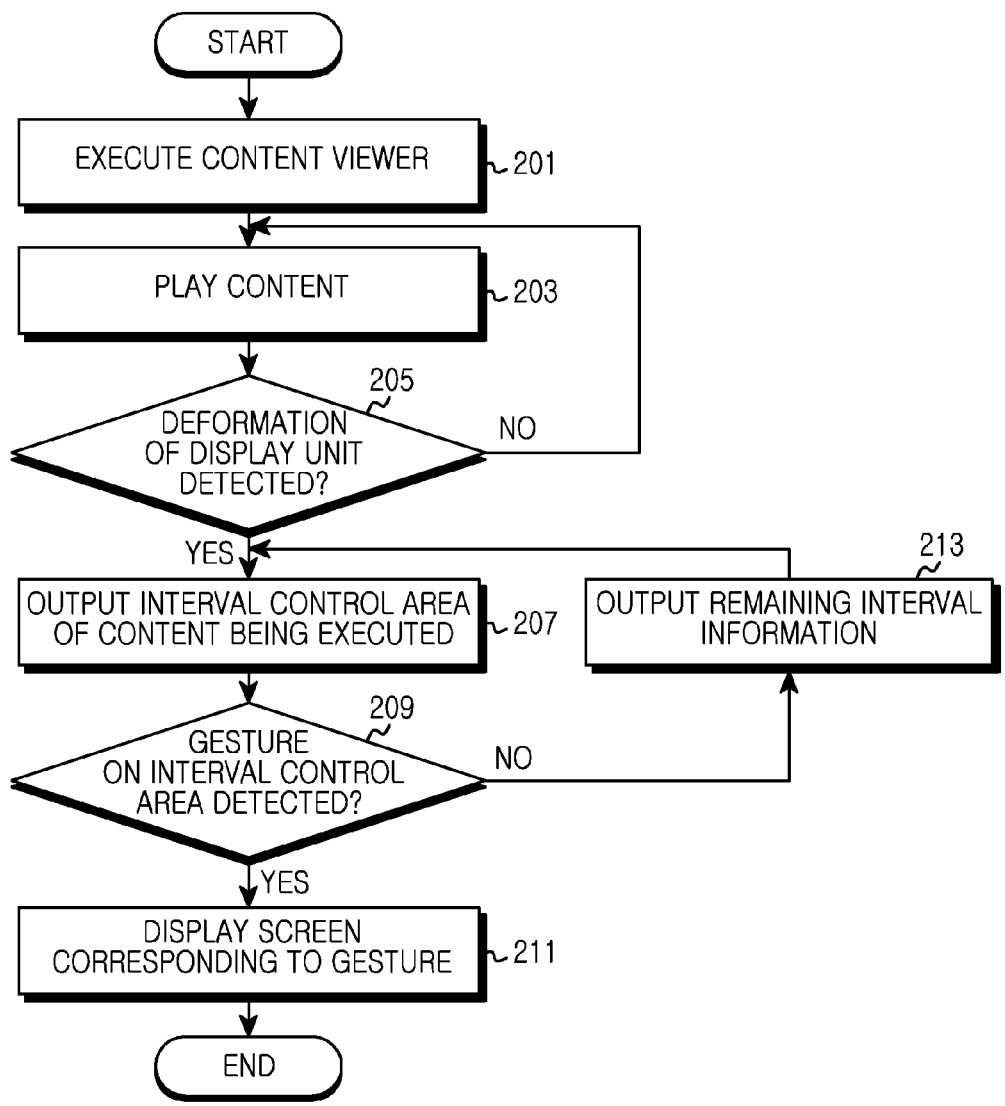
FIG. 2 is a flowchart illustrating a process for controlling content playback in an electronic device, according to an embodiment of the present invention.

FIG. 2 is a flowchart illustrating a process for controlling content playback in an electronic device, according to an embodiment of the present invention.

Referring to FIG. 2, the electronic device includes a flexible display unit as a display means, and also is referred to as a flexible device.

Such an electronic device (e.g., a flexible device) may have a display unit that is deformed according to external force. The deformation may include bending, curving, folding, rolling, stretching, twisting, unfolding, and wrinkling of a flexible display unit according to external force.

The electronic device executes a content viewer, in step 201. In step 203, the electronic device plays content through the executed content viewer. The content refers to data that can be played in the electronic device, and may include digital content (e.g., e-book and document data) including a plurality of pages.

The content may be digital content (e.g., video data and audio data) including a plurality of frames.

The content may include an album of contents (e.g., an image album and a media album), where each content is grouped.

Accordingly, the content viewer is a program for playing the contents.

The electronic device checks whether a deformation of a display unit is detected, in step 205.

The electronic device 100 may include a sensor for checking a deformation type of a display unit (e.g., stretch, shrinkage, curving, bending, twist, folding, and unfolding) and the degree of deformation. There may be a plurality of such sensors, and they may be mounted on or separated from the display unit.

The electronic device is deformed by external pressure, so that small deformation may be detected even when a user does not intend. Accordingly, the electronic device may determine that the display unit is deformed when the degree of deformation is greater than a predetermined level is detected.

When the deformation of the display unit is not detected in step 205, the electronic device returns to step 203 so as to continuously play content, so that a playback screen of the content is displayed.

When the deformation of the display unit is detected in step 205, the electronic device displays an interval control area on content being executed, in step 207. The interval control area is an area where a gesture is detected to control the playback of the content being executed. Controlling the playback of the content may change the playback time of the content to be before or after the current time.

Controlling the playback of the content may display an index of content being played. In general, the index indicates a point of corresponding data to check specific data in the content, and may be a start point of each chapter configuring an e-book, a storage page point of an e-book, and a user memo point of an e-book.

According to an embodiment of the present invention, a user of the electronic device generates a gesture in the interval control area so as to change a playback time of content being played and displayed, or to display the index of the content.

The electronic device uses a display time of the interval control area as a time at which the display unit is deformed and may use a predetermined user gesture or a predetermined menu input to display the interval control area regardless of the deformation of the display unit.

The electronic device may display the interval control area before the display unit is deformed or may perform an operation of the interval control area only when the display unit is deformed.

In step 209, the electronic device checks whether a user's gesture on the displayed interval control area is detected.

The user's gesture may be a gesture for controlling content playback or a gesture for switching a playback time of content.

The user's gesture may be a gesture for displaying the index of a content being played.

When a gesture is not detected in step 209, the electronic device outputs the degree of content being played (e.g., the amount of playback until now or the amount of playback to be played), in step 213.

The electronic device may output the degree of content playback by using a vibration effect and an audio effect.

For example, the electronic device defines the amount of remaining playback intervals with a plurality of grades, and may differently define a vibration pattern (e.g., a vibration intensity and a vibration time) and an audio signal for each grade.

When a gesture is detected in step 209, the electronic device displays a screen corresponding to the gesture, in step 211.

According to an embodiment of the present invention, the electronic device may change a playback time of displayed content or display the index of content being played, in step 211.

For example, when the electronic device executes an e-book, according to a user's gesture, it may turn a page forward or backward or display the index of the e-book.

In another example, when the electronic device plays audio data, according to a user's gesture, it may change a playback time of audio data forward or backward or display the meta information of the audio data being played as index information.

In another example, when the electronic device displays image data, according to a user's gesture, it may display previous image data or next image data or display the meta information of the image data being played as index information.

In the above description, when the user's gesture is not detected from the interval control area, the degree of content being played is output. However, the electronic device, according to an embodiment of the present invention, may detect a predetermined user gesture so as to output the degree of a playback of a content being played. Specifically, the outputting of the degree of the playback of the content may be one kind of an operation for controlling content playback.

Figure 3:
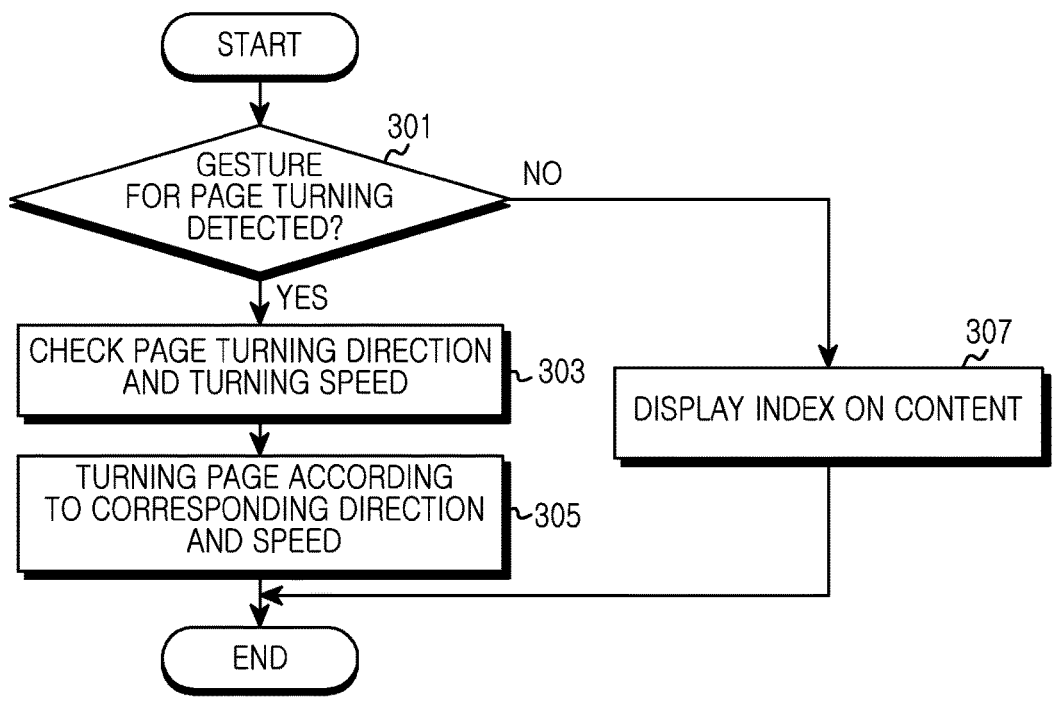
FIG. 3 is a flowchart illustrating a process for controlling content playback in an electronic device, according to an embodiment of the present invention.

FIG. 3 is a flowchart illustrating a process for controlling content playback in an electronic device, according to an embodiment of the present invention.

Referring to FIG. 3, it is assumed that the electronic device detects a user's gesture to control content playback while displaying digital content including a plurality of pages (e.g., an e-book application execution screen). The electronic device may detect a gesture on a displayed interval control area to determine a user's request for changing a playback time of content or displaying the index of a content being played.

Changing the playback time of the content may change a page of an e-book being executed to a previous page or the next page, and displaying the index of the contents may display a start point of each chapter configuring an e-book, a stored page point of an e-book, and a user memo set point of an e-book.

In step 301, the electronic device checks whether a user gesture for page turning is detected.

The page turning may change a page of an e-book being executed into a previous page or the next page, and thus, a user may change a current page into a previous or next page by using a predetermined gesture. Furthermore, the electronic device may adjust a page turning speed and range according to a user's gesture.

When a gesture for page turning is detected in step 301, the electronic device checks a page turning direction and speed, in step 303, and turns a page according to a corresponding direction and speed, in step 305.

The electronic device detects a user's gesture on the interval control area to check a page turning direction and speed, so that it may set a plurality of interval control areas according to an embodiment of the present invention. The number of set interval control areas may be identical to the number of page turning directions.

By setting the number of interval control areas to the number of page turning directions, the interval control areas may be disposed at the both sides of a displayed e-book. According to an embodiment of the present invention, when a user's gesture is detected from a first interval control area in a first direction, the electronic device turns a page in only the first direction, and when a user's gesture is detected from a second interval control area in a second direction, the electronic device turns a page in only the second direction. The first interval control area is an area for turning to a previous page on the basis of a currently-displayed page, and the second interval control area is an area for turning to the next page on the basis of a currently-displayed page.

Each interval control area may be divided into a plurality of areas, and a page turning speed and range may be adjusted to fit a divided area. According to an embodiment of the present invention, the divided areas may be defined as a first area and a second area. When a user's gesture is detected from the first area, the electronic device turns a page at a reference speed in a direction corresponding to the gesture detected interval control area. Also, when a user's gesture is detected from the second area, the electronic device turns a page at a faster speed than a reference speed in a direction corresponding to the gesture detected interval control area.

The electronic device may set one interval control area, according to another embodiment of the present invention. The interval control area is divided into a plurality of areas, and a page is turned in a direction corresponding to an area where a user's gesture is detected.

The divided areas may be defined as a first area and a second area. The first area is an area for turning to a previous page on the basis of a currently-displayed page, and the second area is an area for turning to the next page on the basis of a currently-displayed page.

The first and second areas may be further divided into a plurality of areas, and a page turning speed and range may be adjusted to fit a divided area.

Accordingly, a user of the electronic device generates a gesture in the first area of the interval control area to turn to a previous page and changes a gesture in the first area to adjust a page turning speed.

Setting a plurality of interval control areas is fit for a situation where a user grabs the electronic device with both hands, and setting one interval control area is fit for a situation where a user grabs the electronic device with one hand.

When a gesture for index display is not detected in operation 301, the electronic device displays an index of content, in step 307. The index of digital content including a plurality of pages refers to a start point of each chapter, a stored page point of an e-book, and a user set memo of an e-book.

Figure 4:
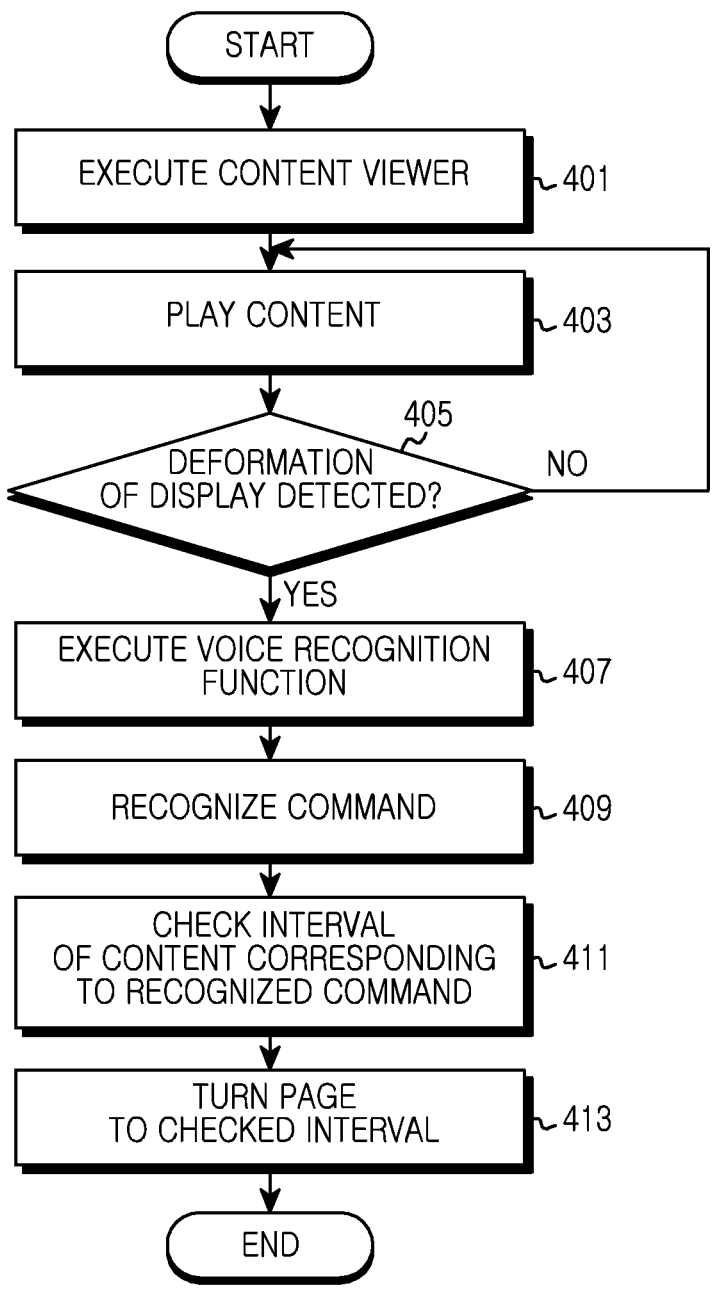
FIG. 4 is a flowchart illustrating a process for controlling content playback in an electronic device, according to another embodiment of the present invention.

FIG. 4 is a flowchart illustrating a process for controlling content playback in an electronic device, according to another embodiment of the present invention.

Referring to FIG. 4, the electronic device includes a flexible display unit as a display means, and also is called a flexible device.

Such an electronic device (e.g., a flexible device) may have a display unit that is deformed according to external force. The deformation may include bending, curving, folding, rolling, stretching, twisting, unfolding, and wrinkling of a flexible display unit according to external force.

The electronic device executes a content viewer, in step 401. The electronic device plays content through the executed content viewer, in step 403. The content refers to data that can be played in the electronic device and may include digital content (e.g., e-book and document data) including a plurality of pages.

The content may be digital content (e.g., video data and audio data) including a plurality of frames.

The content may be an album where each content is grouped.

Accordingly, the content viewer is a program for playing the content.

In step 405, the electronic device determines whether a deformation of a display unit is detected.

When deformation of the display unit is not detected in step 405, the electronic device returns to step 403 so as to continuously play content, and a playback screen of the content is displayed.

When deformation of the display unit is detected in step 405, the electronic device performs a voice recognition function, in step 407, and then recognizes a command, in step 409.

The electronic device checks an interval of content corresponding to a recognized command, in step 411, and turns a page to the checked interval, in step 413.

The electronic device may recognize a command for turning to a previous page from a user's voice.

The electronic device may recognize a command for turning to the next page from a user's voice.

The electronic device may recognize a command for searching for a specific word, page, or content from a user's voice.

The electronic device may recognize a command for checking the degree of content playback from a user's voice.

The electronic device may recognize a command for displaying the index of content from a user's voice.

Figure 5A:
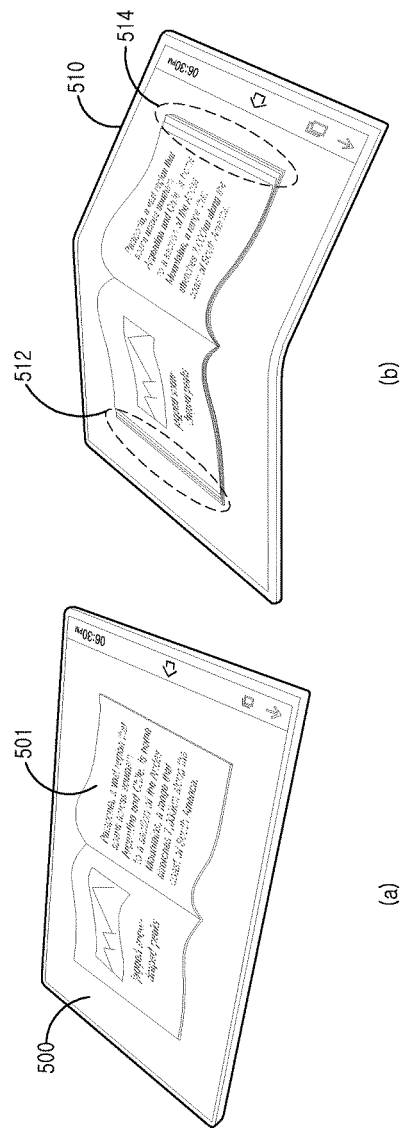
FIG. 5A is a diagram illustrating a process for displaying an interval control area in an electronic device, according to an embodiment of the present invention.
Figure 5B:
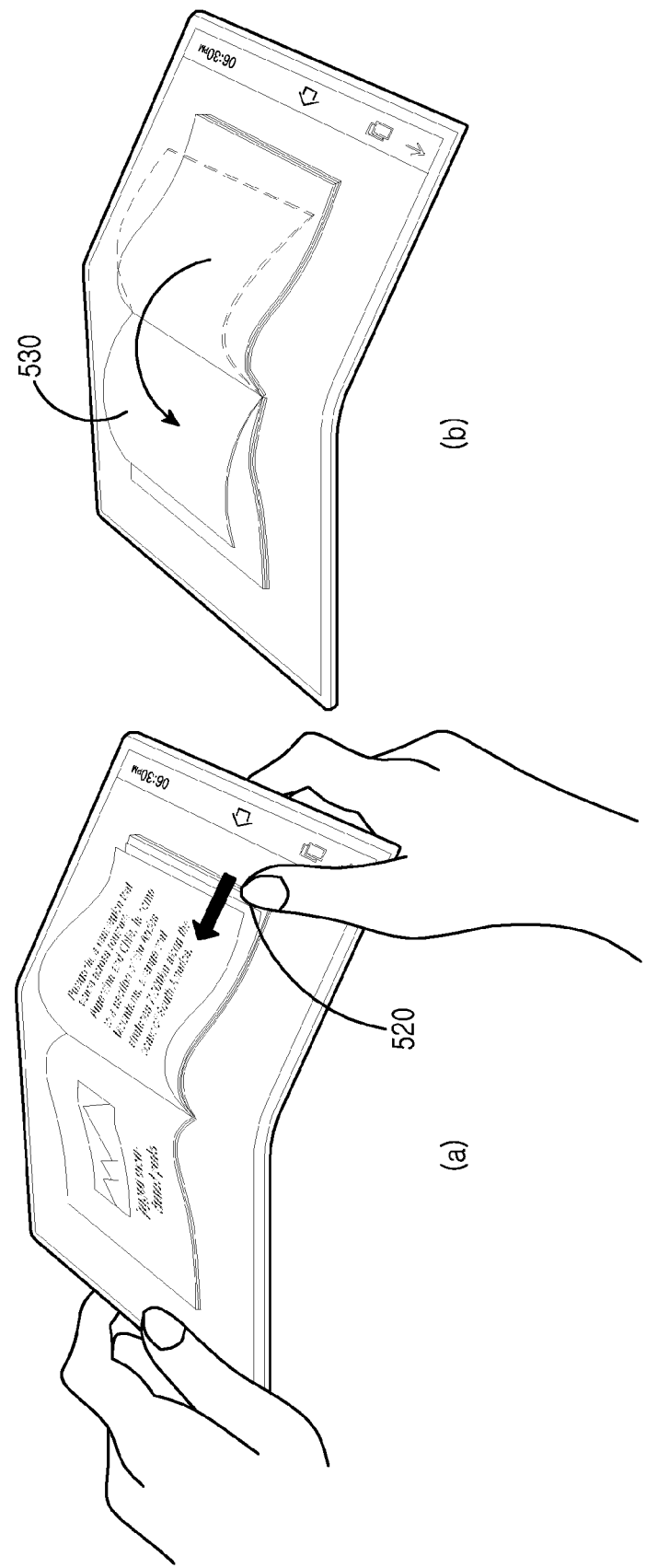
FIG. 5B is a diagram illustrating a screen for turning a page in a first direction in an electronic device, according to an embodiment of the present invention.

FIGS. 5A-C are diagrams illustrating a screen for controlling a content playback interval in an electronic device, according to an embodiment of the present invention.

The electronic device is a flexible device that includes a flexible display unit as a display means.

FIG. 5A is diagrams illustrating a process for displaying an interval control area in an electronic device, according to an embodiment of the present invention.

Electronic device 500 plays digital content 501 having a plurality of pages (e.g., an e-book application execution screen).

As shown in a reference letter (a), the electronic device 500 plays digital content by using a book-shaped frame, so as to provide an effect of seeing an actual book. According to an embodiment of the present invention, the electronic device uses a frame having the same frame as an actual book as the frame of content display, and displays the content in the frame. As shown in the drawing, the electronic device may provide an effect as if an actual book was unfolded.

In relation to such digital content, a page is turned according to a user's gesture (e.g., drag). According to an embodiment of the present invention, if a user's gesture is detected while the content is displayed, the electronic device may turn to a previous or next page while providing an effect as if a page was turned. In general, a gesture for turning a page may be a drag for a corresponding page.

When the page is turned, a sound of turning a page is outputted, so that an effect of seeing an actual book may be acoustically provided.

According to an embodiment of the present invention, the electronic device changes the form of a display unit to control content playback. Controlling the content playback may include page turning, checking the amount of remaining pages or read pages, checking the index of content, and page searching by using a voice command.

For example, as shown in a reference letter (b) of FIG. 5A, when a user changes the form of the electronic device, the electronic device displays interval control areas 512 and 514.

As shown in the drawing, the interval control areas 512 and 514 are disposed at the sides of a book-shaped frame, and the book-shaped frame may include a first interval control area (an interval control area at the left) 512 and a second interval control area (an interval control area at the right) 514. For example, the first interval control area 512 indicates the amount of a played content and the second interval control area 514 indicates the amount of a content to be played.

The first interval control area 512 is an area for turning a page at the left (i.e., a read page) to the right, and the second interval control area 514 is an area for turning a page at the right to the right. Turning a page at the left (i.e., a read page) to the right is turning to a previous page, and turning a page at the right to the left is turning to the next page.

The interval control area may control a page turning speed. For example, the interval control area may be divided into at least two areas using a predetermined reference line. When it is assumed that the interval control area is divided into two areas, a first area is to turn a page at a faster speed than a reference speed, and a second area is to turn a page at a slower speed than a reference speed.

Accordingly, a user of the electronic device may adjust a page turning speed by changing a touch point in an interval control area.

FIG. 5B is diagrams illustrating a screen for turning a page in a first direction in an electronic device, according to an embodiment of the present invention.

The electronic device may display an interval control area when its form is changed during content playback.

Accordingly, a user of the electronic device may generate a gesture in the displayed interval control area so as to control played content.

The interval control area is the side of a book-shaped frame, and when a gesture is detected from the interval control area, the electronic device may turn a page of played content.

The electronic device may check a page turning speed and direction by checking a direction in which a user's gesture is detected.

For example, as shown in reference letter (a) of FIG. 5B, when a gesture for turning a page from a right direction to a left direction in an interval control area is detected at 520, the electronic device turns a right page 530 to the left as shown in reference letter (b) of FIG. 5B. A gesture for turning a page from the right direction to the left direction is a gesture generated in an interval control area for turning a page at the right to the left.

FIG. 5C is diagrams illustrating a screen for turning a page in a second direction in an electronic device, according to an embodiment of the present invention.

As described above, the electronic device may display an interval control area when its form is changed during content playback.

Accordingly, a user of the electronic device may generate a gesture in the displayed interval control area so as to control played content.

According to an embodiment of the present invention, when a gesture is detected from an interval control area, the electronic device may turn a page of a content being played.

The electronic device may check a page turning speed and direction by checking a direction in which a user's gesture is detected.

For example, as shown in a reference letter (a) of FIG. 5C, when a gesture for turning a page from a left direction to a right direction in an interval control area is detected, the electronic device turns the left page to the right as shown in a reference letter (b) of FIG. 5C. A gesture for turning a page from the left direction to the right direction is a gesture generated in an interval control area for turning a page at the left to the right.

FIGS. 6A-D are diagrams illustrating a screen for controlling a content playback interval in an electronic device, according to another embodiment of the present invention.

When the index of content is checked by changing the form of the display unit (e.g., when a user deforms the electronic device), the electronic device may display an interval control area as shown in the drawings.

As shown in the drawings, the interval control area may be the side of an unfolded book-shaped frame.

A user of the electronic device may generate a gesture 601 in the displayed interval control area so as to control played content 600.

According to an embodiment of the present invention, when a gesture is detected from an interval control area, the electronic device may display an index on each chapter by checking the chapters of content being played.

Figures 6A, 6B, 6C, 6D:
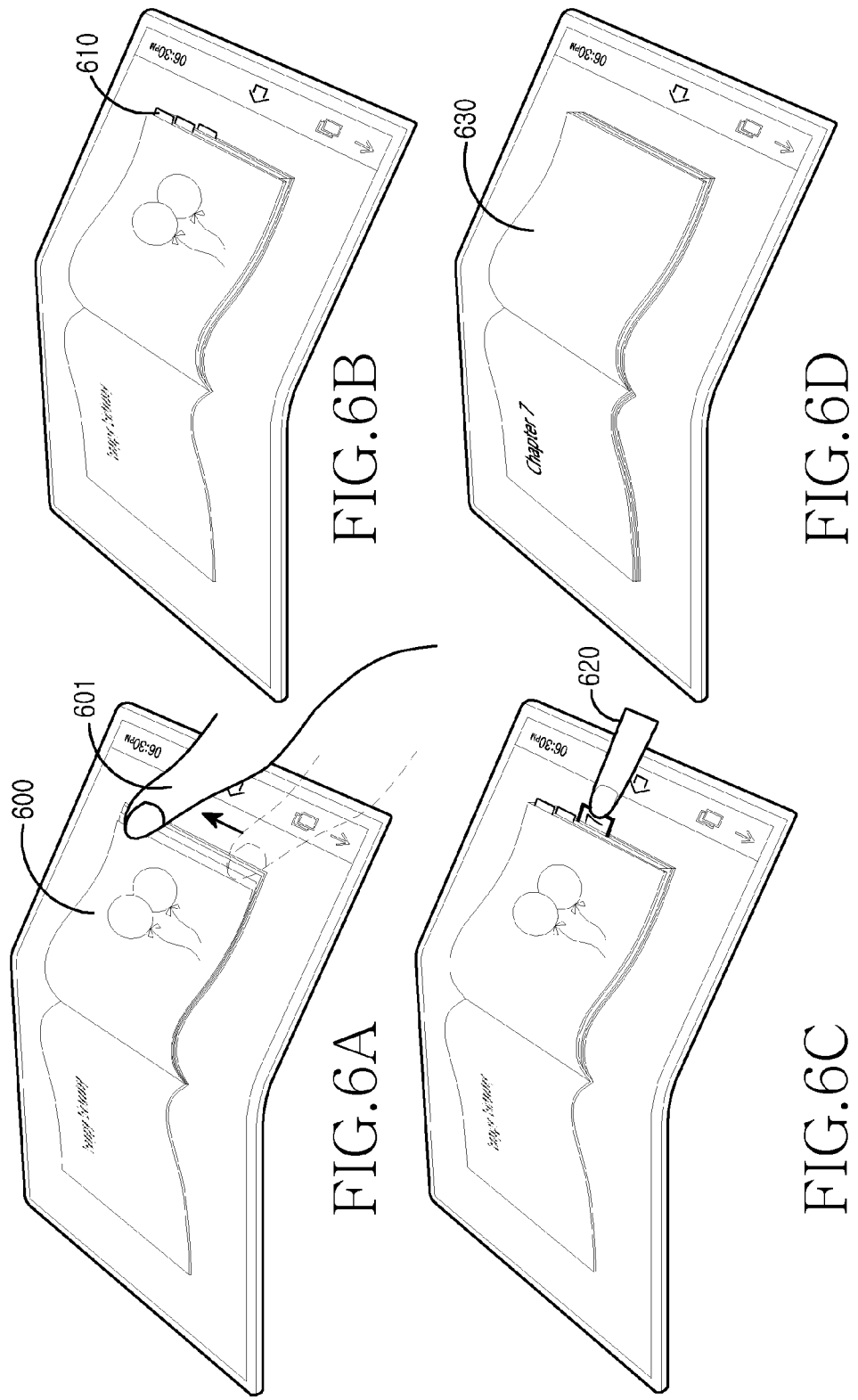
FIGS. 6A-D are diagrams illustrating a screen for controlling a content playback interval in an electronic device, according to another embodiment of the present invention.

For example, as shown in FIG. 6A, when the electronic device detects a predetermined user gesture 601 (in the drawing, the predetermined user gesture is a gesture generated in an interval control area and dragged to the top), as shown in FIG. 6B, the index of chapters 610 in the content is displayed. The displayed index indicates a start point of each chapter, and thus, a user of the electronic device selects an index to change a corresponding chapter into a starting page.

According to an embodiment of the present invention, as shown in FIG. 6C, when a gesture 620 for selecting one of the displayed indices is detected, as shown in FIG. 6D, the electronic device turns to a page 630 of a chapter corresponding to the index that a user selects.

As shown in the drawing, when a user selects an index corresponding to a chapter 7, the electronic device turns to a page where the chapter 7 starts and displays it.

Figures 7A, 7B:
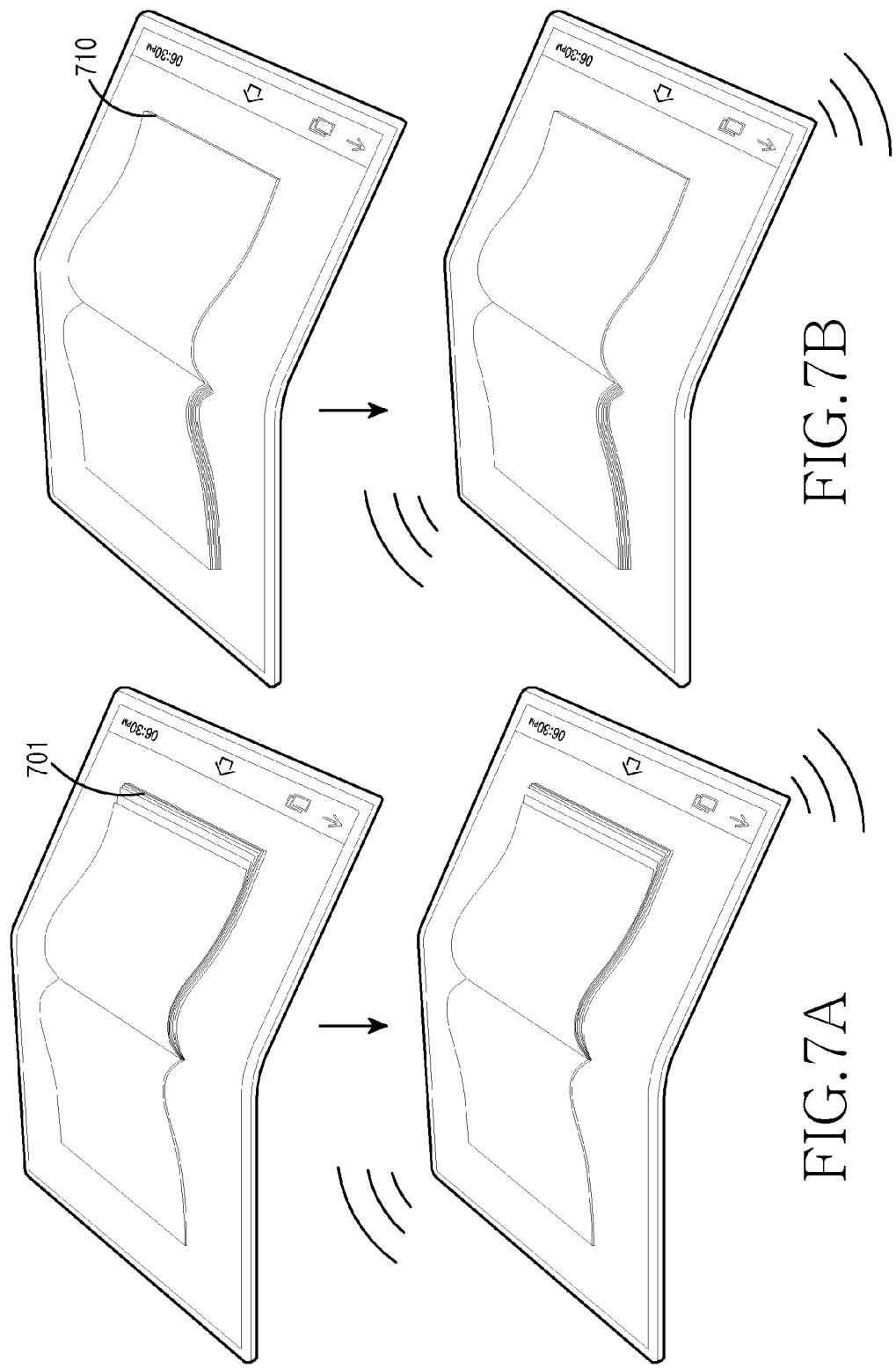
FIGS. 7A-B are diagrams illustrating a situation when content is played in an electronic device, according to another embodiment of the present invention.

FIGS. 7A and 7B are diagrams illustrating a situation when content is played in an electronic device, according to another embodiment of the present invention.

As shown in the drawings, an interval control area may be the side of an unfolded book-shaped frame.

The interval control area indicates the amount of remaining pages that are not played in content, and the width of the interval control area may vary according to a playback situation of the content.

According to an embodiment of the present invention, if the interval control area is wide, there are a large number of pages not played, and if the interval control area is narrow, there are a small number of pages not played.

A user of the electronic device may generate a gesture in the displayed interval control area so as to check a playback situation of content.

According to an embodiment of the present invention, when a gesture is detected from the interval control area, the electronic device may check a playback situation of content and output it by using a vibration pattern (a vibration intensity, the number of vibrations, etc) and an audio signal.

For example, as shown in FIG. 7A, when there are a large number of pages not played, upon detecting a gesture for checking the degree of content playback, the electronic device may generate a vibration pattern corresponding to the remaining pages.

As shown in FIG. 7B, when there are a small number of pages not played 710, upon detecting a gesture for checking a content playback situation, the electronic device may generate a vibration pattern corresponding to the remaining pages.

As the number of remaining pages becomes larger, vibration occurs more intensively.

FIGS. 8A-8C are diagrams illustrating an interval control area displayed by an electronic device, according to another embodiment of the present invention.

An electronic device may turn a page of content by deforming a display unit.

In order to turn a page of content, the electronic device may display an interval control area in a display area.

As shown in the drawings, an interval control area 801 may be the side of an unfolded book-shaped frame as shown in FIG. 8A.

According to an embodiment of the present invention, the interval control area may distinguish a page turning direction of content.

According to an embodiment of the present invention, as shown in FIG. 8B, the interval control area may be divided into a first direction area and a second direction area.

Each direction area may be divided into a first speed area and a second speed area.

A page is turned at a different speed in a first direction by changing a gesture in a first direction area, and a page is turned at a different speed in a second direction by changing a gesture in a second direction area. Such an interval control area may be fit for a user controlling an electronic device with one hand.

According to another embodiment of the present invention, a page turning direction may be predefined in the interval control area.

This is to turn a page in only a corresponding direction through each interval area, and the electronic device may divide and define interval control areas corresponding to a first direction and a second direction.

According to an embodiment of the present invention, as shown in FIG. 8C, the interval control area corresponding to the first direction may be divided into a first speed area and a second speed area.

The page turning direction is predetermined through the interval control area. Specifically, a user may turn a page in a predetermined direction by generating a gesture in the interval control areas, or may change a page turning speed by changing a gesture.

Such an interval control area may be fit for a user controlling an electronic device with both hands.

According to an embodiment of the present invention, the electronic device may realize a content turning direction by using the position information of the electronic device and the deformation information of the display unit. For example, the electronic device checks through a gyro sensor and an acceleration sensor that the left portion of the electronic device faces the bottom and the display unit is deformed, so that it turns a page of a played e-book to the next page as if a paper of an actual book is turned.

FIGS. 9A-9D are diagrams illustrating a process for changing a playback time of content in an electronic device, according to another embodiment of the present invention.

Figure 9A:
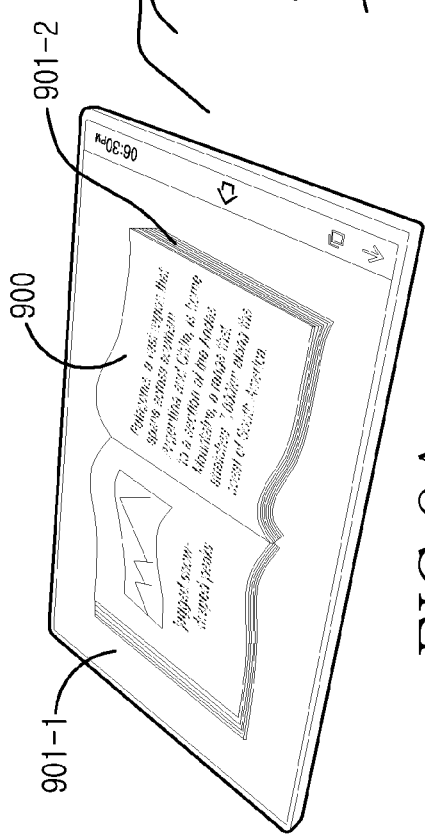
FIGS. 9A-D are diagrams illustrating a process for changing a playback time of content in an electronic device according to another embodiment of the present invention.

Referring to FIG. 9A, an electronic device plays digital content 900 including a plurality of pages (e.g., an e-book application execution screen).

The electronic device plays digital content using a book-shaped frame, so as to provide an effect of seeing an actual book.

In relation to such digital content, a page is turned according to a user's gesture (e.g., drag). Specifically, if a user's gesture is detected while the content is played, the electronic device may turn to a previous or next page while providing an effect as if a page was turned. In general, a gesture for turning a page may be a drag for a corresponding page.

When the page is turned, a sound of turning a page is outputted, so that an effect of seeing an actual book may be acoustically provided.

An electronic device according to an embodiment of the present invention deforms a display unit to change a content playback time such as a page turning of an e-book, a playback time change of multimedia data, etc.

At this point, the electronic device displays an interval control area to determine a playback time change direction and change speed of a content being played, so that a content playback time may be changed by detecting a gesture generated from the interval control area and a deformation of a display unit.

The interval control area may be the side of a book-shaped frame, and the book-shaped frame may include a first interval control area (an interval control area at the left) 901-1 and a second interval control area (an interval control area at the right) 901-2. For example, the first interval control area 901-1 indicates an area where a gesture is detected to change a current content playback time to a previous time, and the second interval control area 901-2 indicates an area where a gesture is detected to change a current content playback time to a subsequent time.

Figure 9B:
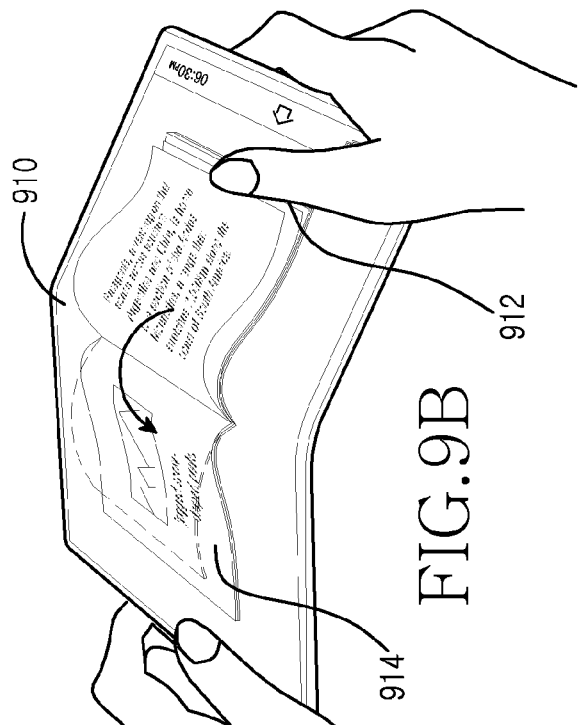

According to an embodiment of the present invention, as shown in FIG. 9B, if a deformation 910 of a display unit is detected while a user's gesture 912 is detected at the second interval control area 901-2, the electronic device may change a current playback time to a next page 914, i.e., a predetermined direction. The electronic device may adjust a change speed of a playback time according to a touch area detected from the interval control area. In general, when a gesture is detected from around the frame of the interval control area, a touch area of the gesturer may be narrower than that at the center of the interval control area.

As described above, since a touch area on an interval control area is distinguished, the electronic device may change a playback time at a speed corresponding to the distinguished touch area.

Figure 9C:
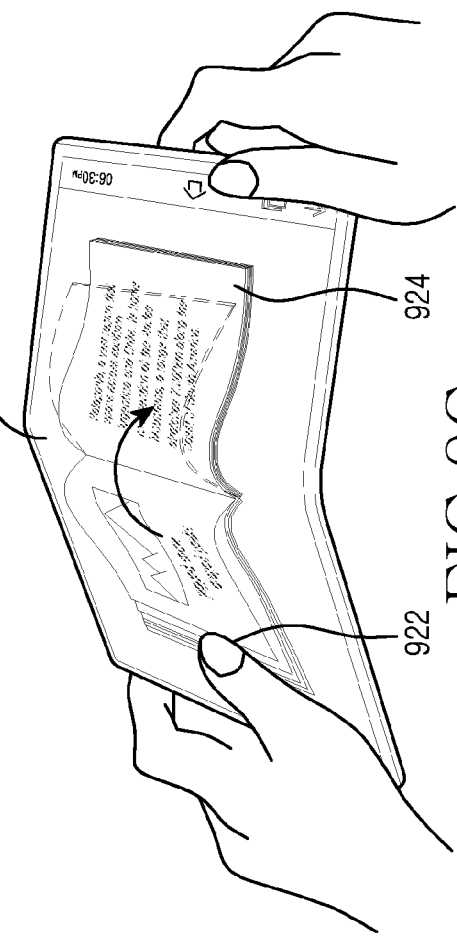
Figure 9D:
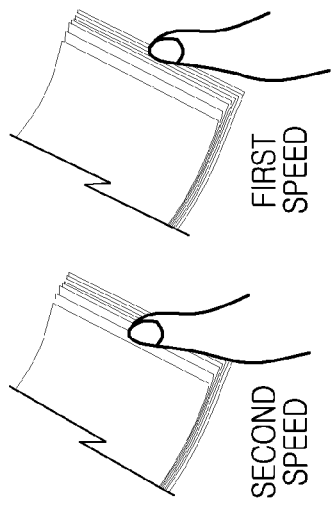

For example, a playback time is changed at a reference speed with respect to an area smaller than a critical value, and a playback time is changed at a faster speed than the reference speed with respect to an area larger than the critical value, as shown in FIG. 9D. When a touch area detected from an interval control area is greater than a critical value, a playback interval is adjusted at a 2× speed, and when a touch area detected from an interval control area is less than a critical value, a playback interval is adjusted at a 1× speed As shown in FIG. 9C, if a deformation 920 of a display unit is detected while a user's gesture 922 is detected from the first interval control area 901-1, the electronic device may change a current playback time to a previous page 924, i.e., a predetermined direction. The electronic device may adjust a change speed of a playback time according to a touch area detected from the interval control area.

If a deformation of a display unit is detected while a user's gesture on a predetermined interval control area is detected, an electronic device, according to an embodiment of the present invention, may change a playback time of a content being played according to a predetermined direction and speed. A user may turn a page by bending a display unit while touching an interval control area, as if the user bent an actual book. This means that a motion for turning a page by flicking the end of an actual book may be identically applied to the electronic device.

Although a change direction and speed of a playback time is determined by a user's gesture on an interval control area as shown in FIGS. 9A-9D, an electronic device, according to an embodiment of the present invention, may determine a change direction and speed of a playback time according to the degree of deformation of a display unit.

When a user's gesture is detected from an interval control area, the electronic device may determine that an event for changing a playback time occurs.

The electronic device checks the degree of bending of a display unit.

The display unit may include a first area (i.e., the left area) and a second area (i.e., the right area) on the basis of the center. A user may change a current playback time of content into a previous time by bending the first area and may change the current playback time of the content into a subsequent time by bending the second area.

The electronic device may distinguish the degree of bending on the basis of a critical value, and may define a different playback time change speed according to the distinguished degree of bending.

A playback time is changed in a direction corresponding to a display unit area deformed while a touch input on the interval control area is maintained.

If a deformation of a display unit is detected while content is played regardless of a user's gesture on an interval control area, the electronic device may determine that an event for changing a playback time occurs.

The electronic device checks the degree of bending a display unit.

The display unit may include a first area (i.e., the left area) and a second area (i.e., the right area) on the basis of the center. A user may change a current playback time of content into a previous time by bending the first area and may change the current playback time of the content into a subsequent time by bending the second area.

The electronic device may distinguish the degree of bending on the basis of a critical value, and may define a different playback time change speed according to the distinguished degree of bending.

A playback time is changed in a direction corresponding to a display unit area deformed regardless of a touch input on the interval control area.

Figure 10:
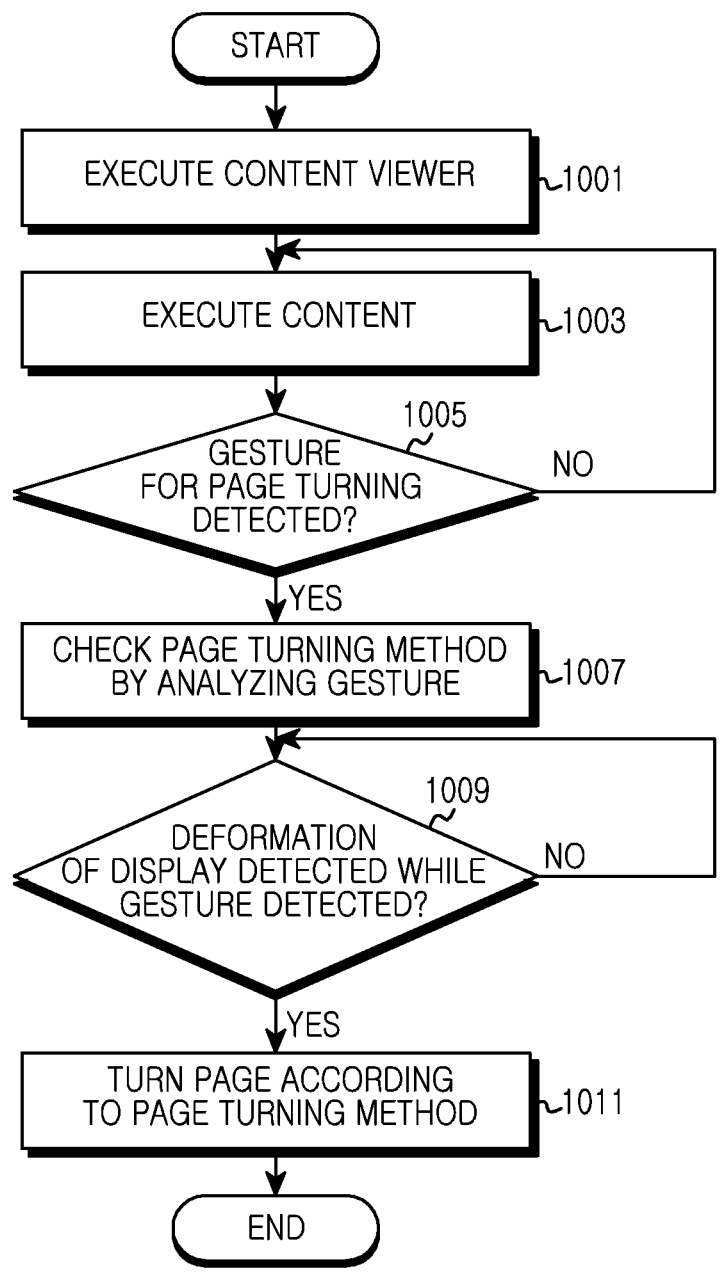
FIG. 10 is a flowchart illustrating a process for changing a playback time of content in an electronic device, according to another embodiment of the present invention.

FIG. 10 is a diagram illustrating a process for changing a playback time of content in an electronic device, according to another embodiment of the present invention.

The electronic device executes a content viewer, in step 1001. The electronic device plays content through the executed content viewer, in step 1003.

In the description below, it is assumed that content of an e-book is executed.

In step 1005, the electronic device determines whether a gesture for turning a page is detected. The electronic device displays an interval control area on content of an e-book played during content playback. The interval control area is an area where a gesture is detected to turn a page of the content being executed. The electronic device may turn a current playback page into a previous or next page by detecting a gesture on the interval control area.

When a gesture for page turning is not detected in step 1005, the electronic device returns to step 1003 and continues to execute the content.

When the gesture for page turning is detected in step 1005, the electronic device analyzes the gesture and checks a page turning method, in step 1007.

The page turning method includes a method of turning a currently output page, such as a page turning direction and a page turning speed.

The electronic device displays a first interval control area and a second interval control area during content playback. The first interval control area indicates an area where a gesture is detected to change a current content playback time to a previous time, and the second interval control area indicates an area where a gesture is detected to change a current content playback time to a subsequent time.

The electronic device may check an interval control area where a user's gesture is detected so as to confirm a page turning direction. Furthermore, the electronic device may check a page turning speed by using a touch area of the interval control area.

The electronic device determines whether a deformation of a display unit is detected while a gesture is detected, in step 1009.

When the deformation of the display is not detected, the electronic device performs step 1009 again.

When the deformation of the display unit is detected, the electronic device turns a page to be fit for a confirmed page turning method, in step 1011.

An electronic device performing the operation of FIG. 10 may turn a page of content being played according a predetermined direction and speed, if a deformation of a display unit is detected while a user's gesture on a predetermined interval control area is detected.

According to an electronic device and method for controlling content playback, an e-book function providing a feeling of reading an actual book may be provided by deforming the electronic device as if a user deforms an actual book and controlling content playback.

It will be appreciated that embodiments of the present invention can be realized in the form of hardware, software or a combination of hardware and software. Any such software may be stored in a non-transient computer readable storage medium. The non-transient computer readable storage medium stores one or more programs (software modules), the one or more programs including instructions, which when executed by one or more processors in an electronic device, cause the electronic device to perform a method of the present invention. Any such software may be stored in the form of volatile or non-volatile storage such as, for example, a storage device like a ROM, whether erasable or rewritable or not, or in the form of memory such as, for example, Random Access Memory (RAM), memory chips, device or integrated circuits, or on an optically or magnetically readable medium such as, for example, a Compact Disc (CD), Digital Versatile Disc (DVD), magnetic disk, or magnetic tape, or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium, such as a communication signal carried over a wired or wireless connection, and embodiments suitably encompass the same.

While the invention has been shown and described with reference to certain embodiments thereof, it will be understood by those skilled in the art that various changes in form and detail may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for controlling an electronic-book (e-book) in an electronic device, the method comprising:
   displaying a page of the e-book;
   detecting a deformation of a display unit of the electronic device;
   displaying a gesture detection area adjacent to the displayed page in a form of a side of an actual book in response to detecting the deformation of the display unit of the electronic device, a size of the gesture detection area being proportional to an amount of next pages or previous pages of the e-book;
   detecting a touch input of a user;
   determining, based on the touch input, a size of a touch area included within the gesture detection area in an entire area touched by the user; and
   controlling a function of the e-book according to the touch input of the user,
   wherein a turning direction of the page is preset in the gesture detection area,
   wherein when the size of the touch area is greater than or equal to a threshold, the page is turned at a speed faster than a reference speed,
   wherein when the size of the touch area is less than the threshold, the page is turned at a speed slower than the reference speed.

2. The method of claim 1, wherein controlling the function of the e-book comprises at least one of turning the page of the e-book and displaying an index of the e-book.

3. The method of claim 2, wherein turning the page of the e-book comprises turning the page of the e-book by deforming the display unit.

4. The method of claim 2, wherein turning the page of the e-book comprises providing information on remaining pages of the e-book by deforming the display unit.

5. The method of claim 2, wherein displaying the index of the e-book comprises providing information on at least one of a start page of a chapter configuring the e-book, a stored page of the e-book, and a page of a memo set in the e-book.

6. The method of claim 1, wherein controlling the function of the e-book comprises using at least one of a visual effect, an auditory effect, and a tactile effect.

7. The method of claim 1, further comprising:
   recognizing a voice command for controlling the function of the e-book when the display unit is deformed; and
   controlling the function of the e-book according to the recognized voice command.

8. An apparatus for controlling an electronic-book (e-book) of an electronic device, the apparatus comprising:
   a display unit configured to be deformable and to display a page of the e-book; and
   a processor configured to:
      detect a deformation of the display unit of the electronic device;
      control the display unit to display a gesture detection area adjacent to the displayed page in a form of a side of an actual book in response to detecting the deformation of the display unit of the electronic device, a size of the gesture detection area being proportional to an amount of next pages or previous pages of the e-book;
      detect a touch input of a user;
      determining, based on the touch input, a size of a touch area included within the gesture detection area in an entire area touched by the user; and
      control a function of the e-book according to the touch input of the user,
      wherein a turning direction of the page is preset in the gesture detection area, and
      wherein when the size of the touch area is greater than or equal to a threshold, the page is turned at a speed faster than a reference speed,
      wherein when the size of the touch area is less than the threshold, the page is turned at a speed slower than the reference speed.

9. The apparatus of claim 8, wherein the processor is configured to perform at least one of an operation of turning the page of the e-book and an operation of displaying an index of the e-book.

10. The apparatus of claim 9, wherein the processor is configured to turn the page of the e-book when the display unit is deformed.

11. The apparatus of claim 9, wherein the processor is configured to provide information on remaining pages of the e-book when the display unit is deformed.

12. The apparatus of claim 9, wherein the processor is configured to provide information on at least one of a start page of a chapter configuring the e-book, a stored page of the e-book, and a page of a memo set in the e-book.

13. The apparatus of claim 8, wherein the processor is configured to use at least one of a visual effect, an auditory effect, and a tactile effect.

14. The apparatus of claim 8, wherein the processor is configured to recognize a voice command for controlling the function of the e-book when the display unit is deformed, and control the function of the e-book according to the recognized voice command.

15. A non-transitory computer readable recording medium having a program recorded thereon, which, when executed by a computer, performs:
   displaying a page of the e-book;
   detecting a deformation of a display unit of the electronic device;
   displaying a gesture detection area adjacent to the displayed page in a form of a side of an actual book in response to detecting the deformation of the display unit of the electronic device, a size of the gesture detection area being proportional to an amount of next pages or previous pages of the e-book;
   detecting a touch input of a user; and
   determining, based on the touch input, a size of a touch area included within the gesture detection area in an entire area touched by the user;
   controlling a function of the e-book according to the touch input of the user, wherein a turning direction of the page is preset in the gesture detection area, and wherein when the size of the touch area is greater than or equal to a threshold, the page is turned at a speed faster than a reference speed, wherein when the size of the touch area is less than the threshold, the page is turned at a speed slower than the reference speed.

* * * * *